United States Patent
Denda et al.

(10) Patent No.: US 7,061,838 B2
(45) Date of Patent: Jun. 13, 2006

(54) APPARATUS AND METHOD FOR CACHING AND SELECTIVELY REPRODUCING INFORMATION FROM RECORDING MEDIA

(75) Inventors: Akihiro Denda, Saitama (JP); Yoshiya Nonaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 462 days.

(21) Appl. No.: 10/092,296

(22) Filed: Mar. 7, 2002

(65) Prior Publication Data

US 2002/0126594 A1 Sep. 12, 2002

(30) Foreign Application Priority Data

Mar. 8, 2001 (JP) .................... P. 2001-064670

(51) Int. Cl.
G11B 7/28 (2006.01)
G11B 20/10 (2006.01)
G11B 19/02 (2006.01)

(52) U.S. Cl. ..................... 369/47.12; 369/85

(58) Field of Classification Search ............. 369/47.12, 369/47.11, 53.21, 83, 84, 85
See application file for complete search history.

(56) References Cited

U.S. PATENT DOCUMENTS

| 4,872,151 A | * | 10/1989 | Smith | .......................... 369/14 |
| 5,392,264 A | * | 2/1995 | Hira | .......................... 369/30.06 |
| 5,502,700 A | * | 3/1996 | Shinada | .................... 369/47.11 |
| 5,694,381 A | * | 12/1997 | Sako | ........................ 369/47.12 |
| 5,764,607 A | | 6/1998 | Maeda et al. | |
| 5,881,041 A | * | 3/1999 | Takenaka | .................. 369/47.12 |
| 6,292,440 B1 | * | 9/2001 | Lee | ............................... 369/7 |

FOREIGN PATENT DOCUMENTS

| EP | 0 570 191 A2 | 11/1993 |
| EP | 0 997 812 A1 | 5/2000 |
| EP | 1 103 973 A2 | 5/2001 |
| EP | 1 130 915 A2 | 9/2001 |
| EP | 1 199 719 A2 | 4/2002 |
| JP | 58164059 A * | 9/1983 |
| WO | WO 00/31742 A1 | 6/2000 |

OTHER PUBLICATIONS

English Language Abstract; JP 07326130; Published Dec. 12, 1995; Sharp Corp.
English Language Abstract; JP 03235282; Published Oct. 21, 1991; Sanyo Electric Co., Ltd.
English Language Abstract; JP 05128638; Published May 25, 1993; Nissan Motor Co. Ltd.
English Language Abstract; JP 2000148558; Published May 30, 2000; Matsushita Electronics Industry Corp.

* cited by examiner

Primary Examiner—Brian E. Miller
Assistant Examiner—Peter Vincent Agustin
(74) Attorney, Agent, or Firm—Sughrue Mion, PLLC

(57) ABSTRACT

A system control microcomputer 31 of a control section 3 controls to automatically make a temporary copy in a temporary area B of a recording/reproducing section 2, and reproduce by reading this temporary copy, when an optical disc 12 is inserted for reproduction, and invalidate or delete the previous temporary copy, when the optical disc 12 is ejected.

13 Claims, 3 Drawing Sheets

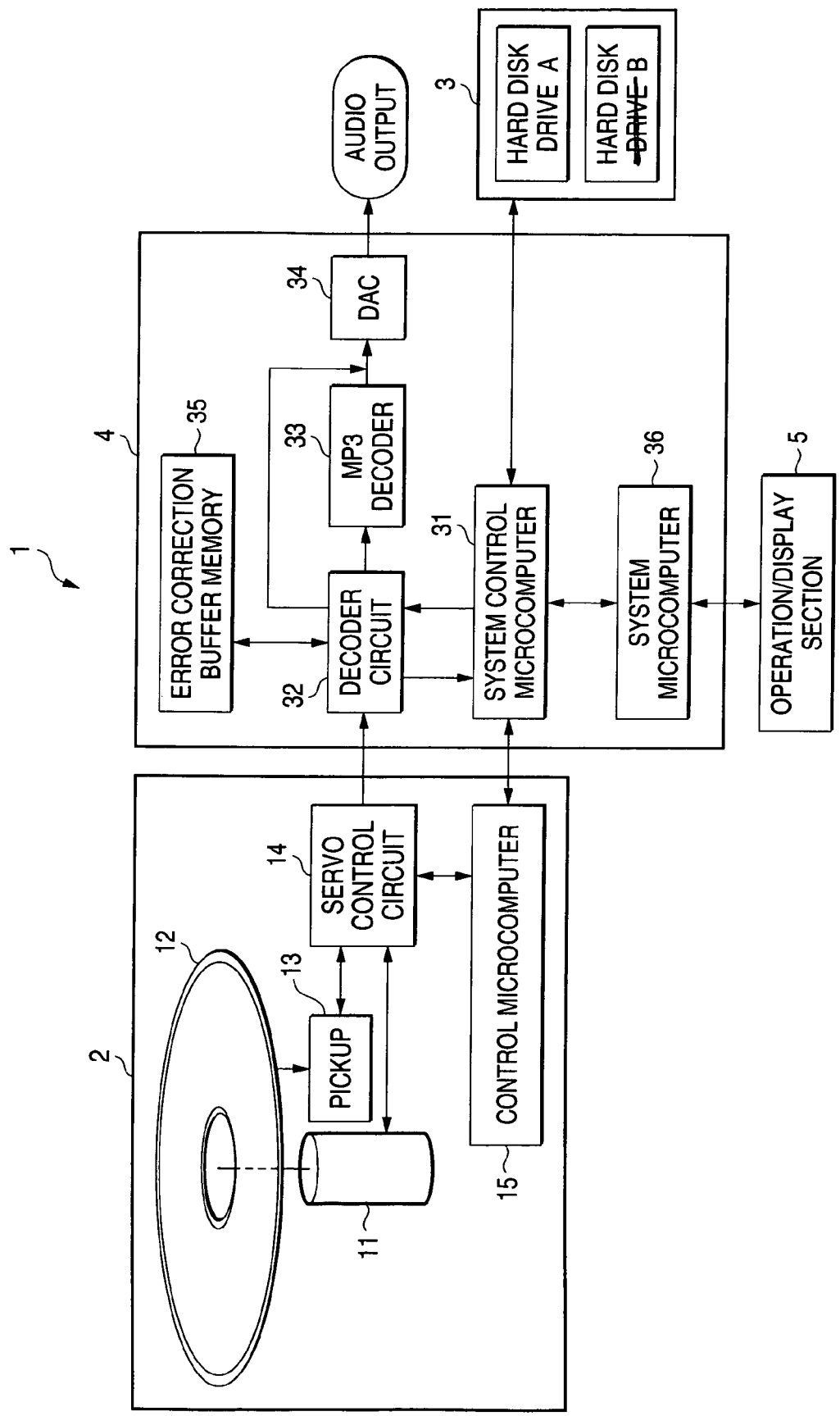

APPARATUS AND METHOD FOR CACHING AND SELECTIVELY REPRODUCING INFORMATION FROM RECORDING MEDIA

BACKGROUND OF THE INVENTION

1. Field of the Invention

The present invention relates to an information reproducing apparatus and method for reproducing program information recorded on a recording medium.

2. Description of the Related Art

There is an information reproducing apparatus for reproducing program information, for example, recorded on a CD (Compact disc) or an MP3 (MPEG: Moving Picture Experts Group; Audio Layer III) CD.

The MP3 CD records the compressed data in which the program information recorded on the CD is compressed in accordance with the MP3 method. That is, the MP3 CD has a copy of the same information as recorded on the CD.

In the information reproducing apparatus, the program information is generally reproduced by positioning an optical pickup at the top of the program information recorded on the recording medium and optically reading the program information.

For example, in case of reproducing the program information corresponding to an address specified by a user, the direction, time or distance of moving the optical pickup is calculated from the current position of the optical pickup and the address location where the program information is recorded, when the address is specified, and then the optical pickup is moved to the top position of the program information on the basis of the calculated result, whereby the desired program information can be reproduced.

The reproducing apparatus making the above operation has poor access performance because it takes a certain time to move the optical pickup.

A reproducing apparatus mounted on the vehicle, for example, which is employed in the environment susceptible to vibration from the outside, has a problem that the information reading position of the optical pickup departs, or a so-called sound skip is prone to occur.

Nowadays, there is an information reproducing apparatus with a mass storage such as a hard disk in which the program information is recorded on the mass storage, and the recorded program information is reproduced. This information reproducing apparatus has a faster access speed than the above-mentioned reproducing apparatus because there is no operation of moving the optical pickup in respect of reproducing the program information recorded on the hard disk, and can withstand the fault such as sound skip due to vibration when it is mounted on the vehicle.

That is, it is desired to improve the access performance including there production response for the program information recorded on the recording medium such as CD or MP3 CD by the effective use of the hard disk, and construct the information reproducing apparatus that can withstand the vibration if mounted on the vehicle.

In making the effective use of the hard disk, it is desired to resolve the problem on the Copyright Law in which the program information once copied on the MP3 CD is copied again onto the hard disk.

SUMMARY OF THE INVENTION

The present invention has been achieved in the light of the above-mentioned problems, and it is an object of the invention to provide an information reproducing apparatus having the improved access performance including the reproduction response for the program information recorded on the recording medium such as CD or MP3 CD by making the effective use of the hard disk, in which the problem on the Copyright Law is resolved.

In order to accomplish the above object, according to the present invention, there is provided an information reproducing apparatus for reproducing the program information recorded on a recording medium, characterized by comprising first reproducing means for reproducing the program information recorded on a first recording medium such as a CD or an MP3 CD mounted at a predetermined position, copying means for copying temporarily the program information reproduced by the first reproducing means on a second recording medium such as a hard disk, second reproducing means such as a hard disk drive for reproducing the copied program information, judgement means for judging whether or not the program information corresponding to the TOC information is copied onto the second recording medium by reading the TOC information recorded in a read-in area of the CD, for example, when the program information is reproduced by the first reproducing means, and control means for controlling the reproducing operation of the program information recorded on the first recording medium to be stopped and the copied program information to be reproduced, if it is judged that the program information is copied.

The information reproducing apparatus may further comprise deletion means for deleting the program information temporarily copied, wherein the control means controls the deletion means to delete the copied program information from the second recording medium, when the first recording medium is removed from the predetermined position.

The control means may control the second reproducing means not to reproduce the copied program information, when the first recording medium is not mounted at the predetermined position.

In the information reproducing apparatus as constituted in the above way, when the program information recorded on the first recording medium is reproduced by the first reproducing means, the reproducing operation by the first reproducing means is stopped and the program information copied on the second recording medium is reproduced, if the program information to be reproduced is copied temporarily on the second recording medium. And when the first recording medium is removed from the predetermined position of the first reproducing means, for example, when the first recording medium is ejected from the first reproducing means, the copied program information is deleted from the second recording medium. Moreover, when the first recording medium is not mounted on the first reproducing means, the program information copied on the second recording medium is not reproduced.

Thereby, it is possible to improve the access performance including the reproduction response of the program information recorded on the recording medium such as CD or MP3 CD. When the recording medium such as CD or MP3 CD is removed from the reproducing means, or not mounted, the program information copied on the second recording medium is not reproduced, or deleted from the second recording medium, whereby the copyright protection is taken into consideration.

Also, according to the invention, there is provided an information reproducing method for reproducing the program information recorded on a recording medium, characterized by comprising the steps of reproducing the program information recorded on a first recording medium, copying temporarily the reproduced program information on a second recording medium, reproducing the copied program information, judging whether or not the program information is copied onto the second recording medium, when the program information recorded on the first recording medium is reproduced, and controlling the reproducing operation of the program information recorded on the first recording medium to be stopped and the copied program information to be reproduced, if it is judged that the program information is copied.

In this information reproducing method, when the program information recorded on the first recording medium is reproduced, the reproducing operation of the program information recorded on the first recording medium is stopped, and the copied program information is reproduced, if the program information is temporarily copied on the second recording medium.

Thereby, it is possible to improve the access performance including the reproduction response of the program information recorded on the recording medium such as CD or MP3 CD.

BRIEF DESCRIPTION OF THE DRAWINGS

FIG. 1 is a block diagram showing one embodiment of the present invention.

DETAILED DESCRIPTION OF THE PRESENT INVENTION

Figure 2A:
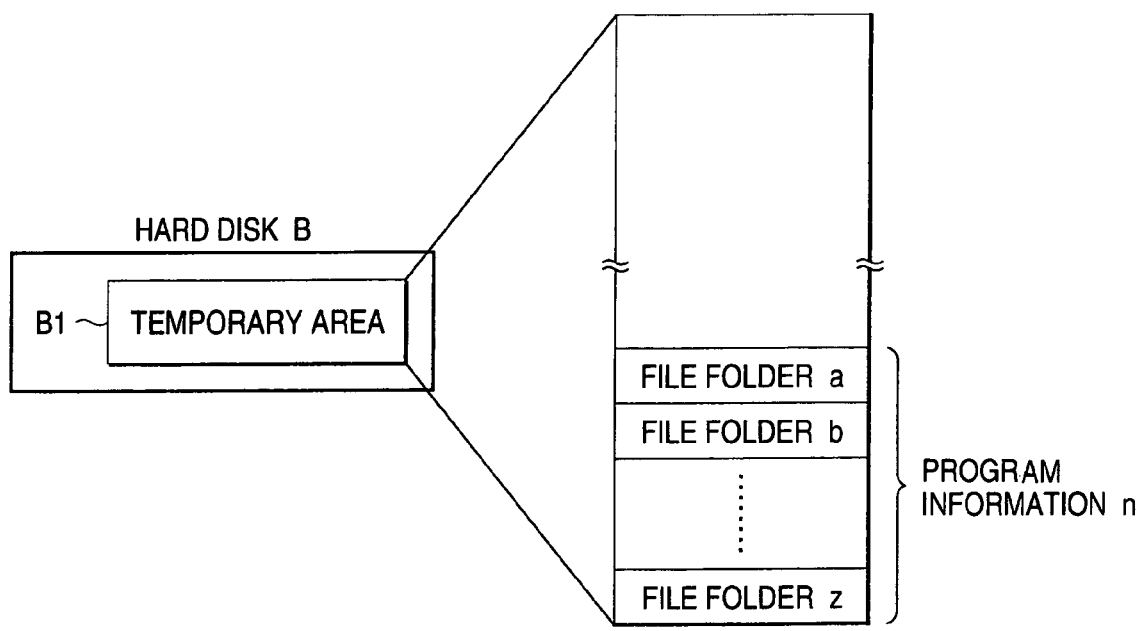
FIGS. 2A and 2B are diagrams for explaining the operation in the embodiment of the invention, and typically showing the data structure in the hard disk B.

The preferred embodiments of the present invention will be described below with reference to the accompanying drawings. In this embodiment, a first recording medium is an MP3 CD and a second medium is a hard disk.

First of all, the configuration of an information reproducing apparatus will be set forth with reference to a block diagram of FIG. 1.

In FIG. 1, an information reproducing apparatus 1 of the invention comprises a reproduction section 2 for reproducing program information recorded on a MP3 CD (hereinafter referred to as an "optical disc") 12 that is the first recording medium 12, a recording/reproducing section 3 for recording the program information on the hard disk B that is the second recording medium or reproducing the recorded program information, a control section 4 for controlling the reproduction section 2 and the recording/reproducing section 3 and making the compression or expansion of the program information reproduced by the reproduction section 2 and the recording/reproducing section 3, and an operation/display section 5 having an operation portion for the user to make the operation and a display portion formed of a liquid crystal display.

The reproduction section 2 comprises a spindle motor 11 for rotating the optical disc 12 mounted by a turntable or clamper at a predetermined linear velocity, a pickup 13 for reading optically the information recorded on the optical disc 12 and converting it into electrical signal for output, a servo control circuit 14, and a control microcomputer 15.

The servo control circuit 14 performs the signal processing of an electrical signal output from the pickup 13 to generate an error signal such as a tracking error signal or a focus error signal, and an RF signal. After the generated RF reproduced signal is converted into digital signal, the digital signal is demodulated and error corrected in conformance with a data format of the optical disc 12, and supplied to a decoder circuit 32 provided in the control section 4.

Also, the servo control circuit 14 makes the focus servo and tracking servo with pickup 13 by an error signal such as focus error signal or tracking error signal, and a synchronization error signal obtained by the demodulation and the error correction in accordance with an instruction from the control microcomputer 15, and makes the servo control of the rotation speed of the spindle motor 11.

Also, the servo control circuit 14 supplies the demodulated and error corrected data to the decoder circuit 32, and supplies the identification information recorded on the optical disc 12 to a system control microcomputer 31 provided on the control section 4.

This identification information is the TOC information recorded in a read-in area of the optical disc 12. This TOC information includes the reproduction condition of the program information, and the attached number for identifying the program information, whereby the servo control circuit 14 supplies this information to the system control microcomputer 31.

The recording/reproducing section 3 comprises a hard disk drive A and a hard disk B that is a recording area where the program information is recorded by the hard disk drive A.

The hard disk drive A involves the recording (copy) of the program information onto the hard disk B, and the reproduction or deletion of the recorded (copied) program information. The hard disk B is divided into a temporary area for copying temporarily the program information recorded on the optical disc 12, and a recording area for recording the program information recorded on the optical disc 12. The program information copied in the temporary area is automatically deleted with the elapse of a predetermined period after copying.

The control section 4 comprises the decoder circuit 32 for decoding the data signal supplied from the servo control circuit 14 of the reproduction section 2, or the data reproduced by the hard disk drive A and recorded on the hard disk B, an error correction buffer memory 35 for temporarily storing the data demodulated and error corrected by the servo control circuit 14 and rearranged in a predetermined order, an MP3 decoder 33 for expanding the compressed data through a compression processing by the MP3 method or the like, a DAC 34 for outputting the expanded data in a digital form or an analog form by converting the digital data into analog data, the system control microcomputer 31, and a system microcomputer 36.

The system control microcomputer 31 comprises a microprocessor (MPU), and controls the entire operation of the information recording/reproducing apparatus 1 by performing a predetermined program. Also, the system control microcomputer 31 makes the compression of data in conformance with the ATRAC (Adaptive Transform Acoustic Coding) 3 standard if the decoded data is supplied from the decoder circuit 32. And it controls the hard disk drive A to record the compressed data in the temporary area of the hard disk B. At this time, the identification information for identifying the program information is also recorded in the temporary area of the hard disk B, corresponding to the compressed data.

The system control microcomputer 31 has an internal memory, not shown, to memorize the program information and the identification information supplied from the servo control circuit 14.

The system microcomputer 36 controls the interface with the operation/display section 5 to be connected. That is, the display data is supplied to the operation/display section 5 in accordance with an instruction from the system control microcomputer 31, and an operation signal from the operation portion provided in the operation/display section 5 is supplied to the system control microcomputer 31.

The operation/display section 5 comprises a display portion (not shown) for displaying the data indicating the track number on the basis of the display data supplied from the system microcomputer 36, and an operation portion (not shown) having a reproduction command button that is depressed to reproduce the program information recorded on the optical disc 12.

In the information reproducing apparatus 1 as constituted above, if the user depresses the reproduction command button on the operation portion, the operation/display section 5 sends its operation signal via the system microcomputer 36 to the system control microcomputer 31. And the system control microcomputer 31 sends a control signal to the control microcomputer 15 to instruct the reproduction.

The control microcomputer 15 controls the servo control circuit 14 in accordance with an instruction from the system control microcomputer 31. And the servo control circuit 14 drives the spindle motor 11 and the pickup 13 in accordance with the instruction to reproduce the program information recorded on the optical disc 12 and supplies the data obtained from the optical disc 12 to the decoder circuit 32 of the control section 4.

The decoder circuit 32 supplies the data from the servo control circuit 14 to the error correction buffer memory 35, decodes the data rearranged in a predetermined order by the error correction buffer memory 35, and supplies the decoded data to the system control microcomputer 31. The MP3 decoder expands the compressed data supplied from the system control microcomputer 31 and supplies the data to the DAC 34, and the DAC 34 outputs the supplied data in digital form or analog form by converting digital data into analog to the amplifier, not shown.

The system control microcomputer 31 records the data supplied from the decoder circuit 32 in the internal memory, and compresses the data in conformance with the ATRAC3 standard. And the system control microcomputer 31 controls the hard disk drive A to copy the compressed data in the temporary area of the hard disk B, and record the identification information supplied beforehand from the servo control circuit 14 to correspond to the data on the hard disk B.

Figure 2B:
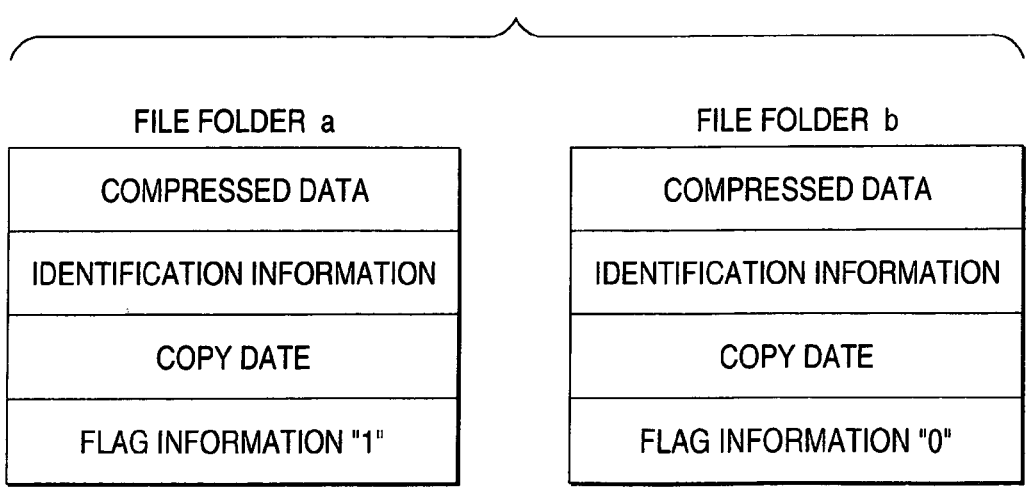

FIGS. 2A and 2B show the structure of the hard disk B. FIG. 2A typically shows how the program information is copied in the temporary area.

As shown in FIG. 2A, the hard disk B is provided with the temporary area B1 for storing the copied program information. The program information copied by the hard disk drive A is stored in the file folder a, b, . . ., z made within the temporary area B1. The file folder is made for each program information.

FIG. 2B typically shows the data stored in the file folder within the temporary area B1. As shown in FIG. 2B, the file folder stores the compressed data that is the copied program information, the identification information for identifying the program information, copy date, and the flag information indicating whether or not the reproduction of copied program information is valid.

The copy date indicates the date when the program information is copied in the temporary area B1. Namely, when the program information is copied in the temporary area B1, the system control microcomputer 31 sets up the copy date by employing a calendar function contained in the information reproducing apparatus.

The program information copied in the temporary area B1 is deleted from the temporary area B1 with reference to the copy date. For example, the system control microcomputer 31 has a default value of one month, and controls the hard disk drive A to delete the program information from the temporary area B1, if the program information resides in the temporary area B1 over a period of one month from the copy date.

The flag information permits the reproduction of the copied program information, if the optical disc 12 is mounted at a predetermined position of the reproduction section 2, the identification information recorded on the optical disc 12 is read by the pickup 13, and is matched with the identification information stored in the file folder. Namely, the flag information "1" in the file folder a indicates that the program information is permitted to reproduce, and the flag information "0" in the file folder b indicates that the program information is not permitted to reproduce, as shown in FIG. 2B.

That is, the flag information is employed to regulate the reproduction by the hard disk drive A. For example, if the user designates the reproduction of the program information recorded on the "hard disk" by manipulating a source selection button in the operation/display section 5, the program information with the flag information "0" is not reproduced. This flag information is updated every time the identification information recorded on the optical disc 12 is read by the optical pickup 12 or the optical disc 12 is moved from the predetermined position.

The data copied in the temporary area B1 and permitted to reproduce is read by the hard disk drive A, and supplied via the decoder circuit 32 to the MP3 decoder 33 to expand the data. The expanded data is supplied to the DAC 34. And the DAC 34 outputs the expanded data in digital form or analog form by converting the digital data into analog data to the amplifier, not shown.

In this manner, if the program information recorded on the optical disc 12 is reproduced, the program information is copied into the temporary area B1 of the hard disk B.

And the program information copied in the temporary area B1 and permitted to reproduce is reproduced by the hard disk drive A, if a reproduction operation for reproducing the program information recorded on the optical disc 12 is performed by the reproduction section 2.

Figure 3:
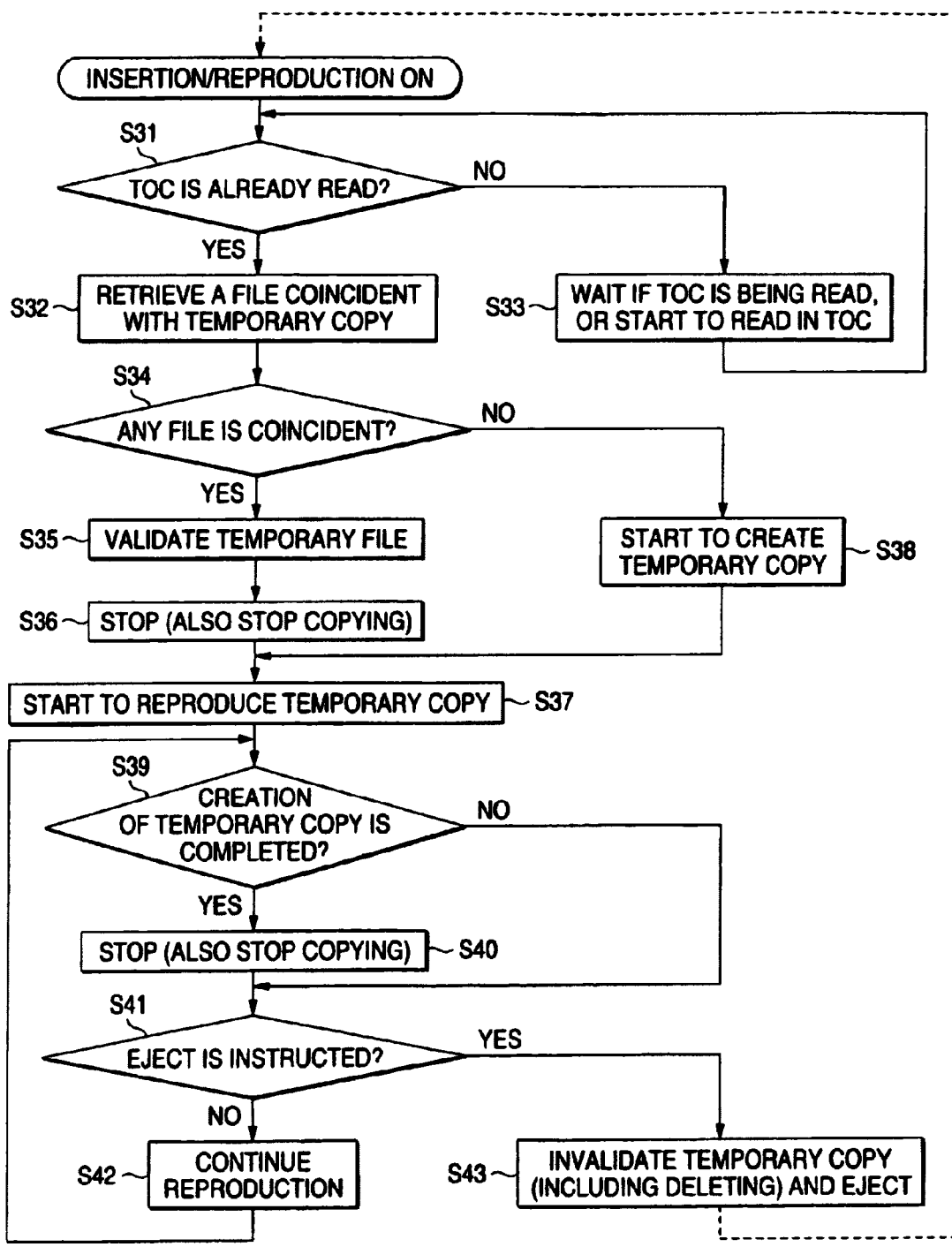
FIG. 3 is a flowchart for explaining the operation in the embodiment of the invention.

Referring now to a flowchart of FIG. 3, the processing operation of the system control microcomputer 31 according to this invention will be described below.

First of all, the user inserts the optical disc 12 into an inlet slot, not shown, of the reproduction section 2. Then, the optical disc 12 is brought to a predetermined position, and mounted on a turntable by a clamper, not shown.

If the user manipulates the source selection button in the operation/display section 5 to designate the reproduction of the program information recorded on the optical disc 12 and depresses the reproduction command button, the system control microcomputer 31 controls the control microcomputer 15 to initiate a servo of the spindle motor 11 to reproduce the program information recorded on the optical disc 12.

And the pickup 13 reads the TOC information that is the identification information recorded in the read-in area.

The start of reproduction operation for the optical disc 12 may be automatically effected by selecting the source upon mounting the optical disc 12 at reproduction position, without manipulating the source selection button and the reproduction instruction button.

The system control microcomputer 31 checks whether or not the reading of the TOC information by the pickup 13 is completed, namely, the supply of the TOC information by the servo control circuit 14 is completed (step S31). If it is determined that the reading of the TOC information is not completed, the system control microcomputer 31 waits till the reading of the TOC information is completed. If it is determined that the reading of the TOC information is not started due to some trouble, the system control microcomputer 31 controls the control microcomputer 15 to start the reading of the TOC information (step S33).

If it is determined that the reading of the TOC information recorded on the optical disc 12 by the optical pickup 13 is completed, it is checked whether or not the file folder (program information) that is coincident with the read TOC information exists in the temporary area B1 of the hard disk B (steps S32 and S33).

If it is determined that the coincident file folder exists, the flag information set up in the file folder is updated from "0" to "1" to permit the reproduction by the hard disk drive A (step S35).

And the system control microcomputer 31 controls the control microcomputer 15 to stop the reproduction operation of the program information recorded on the optical disc 12 by the reproduction section 2. The control microcomputer 15 stops the rotation operation of the spindle motor 11, and the reading operation by the pickup 13 in accordance with an instruction from the system control microcomputer 31 (step S36).

And the reproduction of the program information copied in the temporary area B1 is started (step S37).

On one hand, if it is determined that the coincident file folder does not exist, the file folder is made in the temporary area B1. Then, the program information recorded on the optical disc 12 is reproduced, and the copying of the program information into the file folder made in the temporary area B1 is started (step S38).

And the system control microcomputer 31 controls the hard disk drive A to reproduce the copied program information, while copying the program information into the file folder (step S37) Then, it is checked whether or not the program information into the temporary area B1 is completely copied while being reproduced (step S39).

If it is determined that the program information is completely copied, the system control microcomputer 31 controls the control microcomputer 15 to stop the reproduction operation of the program information recorded on the optical disc 12 by the reproduction section 2. The control microcomputer 15 stops the rotation operation of the spindle motor 11 and the reading operation by the pickup 13 in accordance with an instruction from the system control microcomputer 31 (step S40). If it is determined that the program information is not completely copied, the program information is continuously copied and reproduced in parallel.

Also, the system control microcomputer 31 always monitors the operation of leaving the optical disc 12 away from the predetermined position of the reproduction section 2 by the user operating an eject button provided on the operation/display section 5 (step S41).

If it is determined that the user does not operate the eject button, the reproduction processing of the program information copied into the temporary area B1 or the parallel processing of copying the program information into the temporary area B1 and reproducing the copied program information is continued (step S42).

If it is determined that the user operates the eject button, the flag information of the file folder made in the temporary area B1 is updated from "1" to "0", the file folder itself with the flag information "1" is deleted from the temporary area B1, and the optical disc 12 is ejected from the inlet slot, not shown, of the reproduction section 2 (step S43).

In this way, the program information recorded on the optical disc 12 is copied into the temporary area, and the reproduction of the program information recorded on the optical disc 12 is stopped to reproduce the copied program information. Accordingly, it is possible to improve the access performance of the reproduction response by making effective use of the hard disk. When the optical disc 12 does not exist at the predetermined position, the copied program information is not reproduced. Therefore, it is possible to take into consideration the problems on the Copyright Law.

In the above embodiment of the invention, the program information compressed by the MP3 method is exemplified. However, the invention is not limited thereto, but may be applicable to the program information compressed by the ATRAC3 compression method or other compression methods. Also, the invention is applicable to the program information recorded on the CD and not compressed.

In the above embodiment of the invention, the first recording medium is the MP3 CD, and the second recording medium is the hard disk. However, the invention is not limited thereto, but may be applicable to the CD or DVD as the first recording medium and the MD as the second recording medium.

As described above, with the present invention, if the program information recorded on the optical disc is reproduced, the reproduced program information is temporarily copied onto the hard disk B, and the copied program information is reproduced. Accordingly, it is possible to reproduce the program information, making effective use of the hard disk, thereby improving the access performance of reproduction response. When the optical disc does not exist at a predetermined position, the copied program information cannot be reproduced, whereby it is possible to take into consideration the problems on the Copyright Law.

What is claimed is:

1. An information reproducing apparatus comprising:
   first reproducing means for reproducing program information recorded on a first recording medium mounted at a predetermined position;
   copying means for temporarily copying the program information reproduced by the first reproducing means on a second recording medium;
   second reproducing means for reproducing the program information copied in the second recording medium;
   judgment means for judging if the program information is copied onto the second recording medium when the program information is reproduced by the first reproducing means and
   control means for controlling reproduction of the program information recorded on the first recording medium to be stopped and the program information copied in the second recording medium to be reproduced if it is judged that the program information is copied.

2. The information reproducing apparatus according to claim 1, further comprising deletion means for deleting the program information temporarily copied in the second recording medium,
   wherein the control means controls the deletion means to delete the copied program information from the second recording medium when the first recording medium is removed from the predetermined position.

3. The information reproducing apparatus according to claim 1, wherein the control means controls the second reproducing means not to reproduce the copied program information, when the first recording medium is not mounted at the predetermined position.

4. An information reproducing method comprising:
reproducing program information recorded on a first recording medium;
temporarily copying the reproduced program information on a second recording medium;
reproducing the copied program information;
judging if the program information is copied onto the second recording medium when the program information recorded on the first recording medium is reproduced; and
controlling reproducing of the program information recorded on the first recording medium to be stopped and the copied program information to be reproduced if it is judged that the program information is copied.

5. An information reproducing apparatus comprising:
a first reproducer for reproducing program information recorded on a first recording medium;
a driver for temporarily copying on a second recording medium the program information reproduced by the first reproducer;
a second reproducer for reproducing the program information on the second recording medium; and
a controller which judges that the driver copied the program information to be reproduced onto the second recording medium,
wherein the controller controls the first reproducer not to reproduce the program information on the first recording medium and the second reproducer to reproduce the program information on the second recording medium if the second recording medium contains the program information.

6. The information reproducing apparatus according to claim 5, wherein the driver deletes the program information from the second recording medium when the first recording medium is removed from the first reproducer.

7. The information reproducing apparatus according to claim 5, wherein the controller controls the second reproducer not to reproduce the program information when the first recording medium is not mounted into the first reproducer.

8. The information reproducing apparatus according to claim 5, wherein the first reproducer is a CD player.

9. The information reproducing apparatus according to claim 5, wherein the second reproducer is a hard disk drive unit.

10. An information reproducing apparatus comprising:
a first reproducer for reproducing program information recorded on a first recording medium;
a driver for temporarily copying the program information reproduced by the first reproducer onto a second recording medium;
a second reproducer for reproducing the program information on the second recording medium; and
a controller which judges, prior to the first reproducer's reproduction of the program information if the program information is copied onto the second recording medium,
wherein the controller controls the first reproducer, while copying the program information from the first recording medium onto the second recording medium, to reproduce the program information being copied when it is judged that the program information is not copied onto the second recording medium.

11. An information reproducing apparatus, comprising:
a first reproduction circuit capable of reproducing data from a first recording medium;
a second reproduction circuit capable of reproducing data from a second recording medium; and
a control circuit that
copies program information reproduced by the first reproduction circuit onto the second recording medium, and
determines that the program information has been copied, and
if the control circuit determines that the program information has been copied, the control circuit controls the first reproduction circuit to not reproduce the program information from the first recording medium, and the control circuit controls the second reproduction circuit to reproduce the program information from the second recording medium.

12. The information reproducing apparatus according to claim 11, wherein the control circuit controls the second reproduction circuit to delete the program information from the second recording medium if the first recording medium is removed from the first reproduction circuit.

13. An information reproducing apparatus, comprising:
a first reproduction circuit capable of reproducing data from a first recording medium;
a second reproduction circuit capable of reproducing data from a second recording medium; and
a control circuit that copies program information reproduced by the first reproduction circuit onto the second recording medium, and determines that the program information has been copied, and if the control circuit determines that the program information has been copied, the control circuit controls the first reproduction circuit to not reproduce the program information from the first recording medium, and the control circuit controls the second reproduction circuit to reproduce the program information from the second recording medium, and the control circuit controls the second reproduction circuit to delete the program information from the second recording medium if the first recording medium is removed from the first reproduction circuit.

* * * * *